C. A. JOHNSON.
BELT FASTENER.
APPLICATION FILED AUG. 21, 1916.
1,282,845. Patented Oct. 29, 1918.
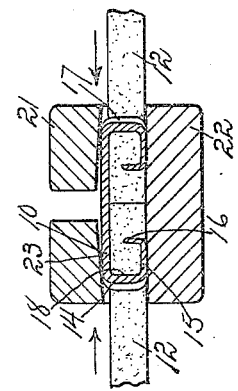
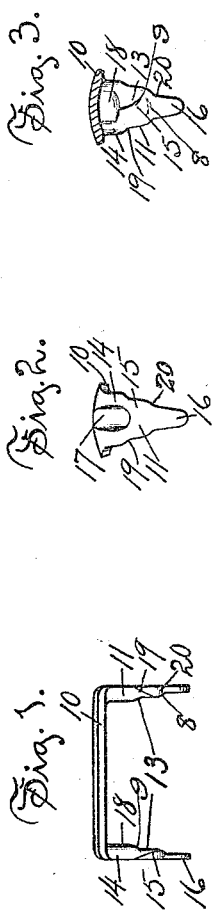
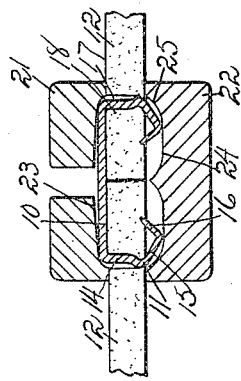
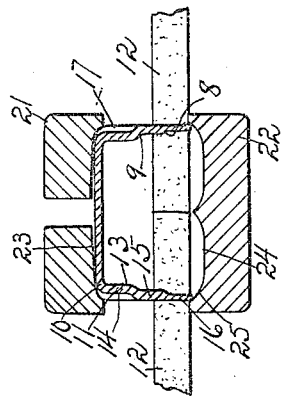
WITNESSES:
INVENTOR.
Charles A. Johnson.
BY Arthur Jenkins,
ATTORNEY.

UNITED STATES PATENT OFFICE.

CHARLES A. JOHNSON, OF UNIONVILLE, CONNECTICUT.

BELT-FASTENER.

1,282,845.  Specification of Letters Patent.  Patented Oct. 29, 1918.

Application filed August 21, 1916. Serial No. 116,199.

*To all whom it may concern:*

Be it known that I, CHARLES A. JOHNSON, a citizen of the United States, and a resident of Unionville, in the county of Hartford and State of Connecticut, have invented new and Improved Belt-Fasteners, of which the following is a specification.

My invention relates more especially to devices for uniting the meeting ends of belts employed for power transmission purposes, and an object of my invention, among others, is to provide means for securely fastening the meeting ends of belts in a prompt and efficient manner.

One form of device embodying my invention and in the construction and use of which the objects herein set out, as well as others, may be attained, is illustrated in the accompanying drawings, in which—

Figure 1 is a view in side elevation of my improved belt fastener.

Fig. 2 is an end view of the same.

Fig. 3 is a view in cross section through the same.

Fig. 4 is a view illustrating an initial step in the operation of applying the fastener.

Fig. 5 is a view illustrating a further step in this operation.

Fig. 6 is a view illustrating the final step in the operation.

My improved fastener is made in the shape of a staple having a base or body 10 with legs or prongs 11 projecting therefrom. The legs of the fastener are designed to be thrust through the meeting ends 12 of a belt and the facing surfaces 13 of the legs are, therefore, nearer together at their bases than at their tips, so that as the legs are forced through the belts the meeting ends thereof will be drawn toward each other.

I also provide means for insuring the form of the staple when the operation of securing the belt ends together is completed by causing the legs to bend at predetermined points. In accomplishing this purpose I divide each leg into a plural number of sections, three sections being shown herein, a base section 14, an intermediate section 15 and a tip 16. The base sections 14 of each fastener are curved in cross section on opposite sides causing depressions 17 to appear on the outside and curved bearing surfaces 18 to be formed on the inside of the legs or prongs. This curved bearing surface on each leg or prong rests against the edge of the opening in which the leg is located in the belt and supports the strains, and, being curved, cutting action of the fastener on the belt is avoided. This curved depression 17 on each leg extends around the corner between the base and leg to a slight degree and provides a means for insuring rigidity of the base 10 and the base section of the leg so that bending action between the two will not take place. The depression in each leg also coacts with shoulders to be hereinafter described to insure that this base section will not be bent but that bending will take place at the outer end of the base section and also that this bending will not take place until after the tip is bent.

The intermediate section 15 is made thinner and narrower than the base section, and the tip 16 is made still thinner and narrower than the intermediate section, the difference in dimensions between the sections being rather abrupt and forming shoulders 8—9 and 19—20, that increase the width and thickness of each leg step by step from the tip toward the base 10. This step by step formation is of especial advantage in enabling the facing surfaces of the base sections of the legs on each staple to be located substantially parallel and at substantially right angles to the inner surface of the base 10, inclined surfaces being thus avoided that, under the pull of a belt, would create a force tending to straighten the bent legs by crowding said ends toward the tips of the legs. The closed ends of the depression 17 on each leg terminates at a point substantially opposite the shoulder 9 on the inside of the leg. The shoulders 9 also form stops to limit the bending of the sections of the legs and thus insure the position of each section at substantially right angles to the adjacent section when the legs are bent to secure the meeting ends of a belt.

My invention contemplates a structure in which either of the sets of shoulders 8—9 or 19, 20, or, in fact any one or more of said shoulders may be omitted, but an extremely efficient fastener will be provided where both sets of shoulders are combined as illustrated herein.

A result of this construction is that when the jaws 21—22 of a clenching tool are applied to the staples the tips 16 will first be bent at an angle to the remaining part of the leg and as shown in Fig. 5 of the drawings the base of the staple being seated in a depression 23 in the jaw 21 and the tips entering depressions 24 in the jaw 22, these depressions 24 being preferably curved at the edges 25 to start the bending of the tips toward each other. In the next step in affixing the staples the jaws 21—22 are separated and the staple is caused to be seated against them at a point back of the depressions 23—24 and a further pressure upon the handles will cause the staples to be driven into the meeting ends of the belt section and assume the form shown in Fig. 6 of the drawings; in this operation the belt ends being drawn together in the direction indicated by the arrow in said Fig. 6.

My improved fastener illustrated and described herein is peculiarly adapted to be bent to secure the meeting ends of a belt by the use of an improved tool forming the subject matter of my copending application of Serial Number 152,424, filed March 3rd, 1917, the jaws of such tool being illustrated in Figs. 4, 5, and 6 of this application.

My improved tool hereinbefore referred to and the peculiar shape of the fastener forming the subject matter of this application is such as to cause the latter to be so embedded in the material composing the belt that no projections appear to injure the persons handling the belts, secured by this fastener.

The weight of a fastener is a material factor in the destruction of a belt traveling at a high rate of speed, as circumstances incident to change of direction of travel of this weight from a straight path to a curved path about a pulley and vice-versa is sufficient to exercise an injurious influence that exhibits itself in wear of the belt at the points where penetrated by the prongs. My improved fastener is exceedingly light so that the ill effects above referred to do not present themselves.

In accordance with the provisions of the patent statutes, I have described the principles of operation of my invention, together with the device which I now consider to represent the best embodiment thereof; but I desire to have it understood that the device shown is only illustrative and that the invention may be carried out by other means within the scope of the appended claims.

I claim—

1. A belt fastener including a base, and a leg projecting therefrom at each end of the base, said legs converging in defined steps from the tips toward the base to draw the meeting ends of a belt together.

2. A belt fastener including a base and a leg projecting therefrom at each end thereof, said legs having shoulders on their facing sides thereby forming each leg with a base section that insures substantially parallel disposition of the base sections of said facing sides when the fastener is bent to secure a belt.

3. A belt fastener including a base, and a leg projecting from each end of the base, said legs being formed in defined sections by shoulders located on a plurality of sides of each leg, each section having a greater resistance to bending force than the adjacent section farther from the base.

4. A belt fastener including a base, and a leg projecting from each end of the base, each leg being formed into sections defined by shoulders arranged in step by step formation.

5. A belt fastener including a base, and a leg projecting from each end of the base and increased in width from the tip to the base of the leg by sections defined by shoulders arranged in step by step formation.

6. A belt fastener including a base, and a leg projecting from each end of the base, each leg being formed into defined sections, each section being stepped one from another forming shoulders on the edges of each leg.

7. A belt fastener including a base, and a leg projecting from each end of the base, each leg being formed into sections, each section being stepped one from another forming shoulders arranged on the inner surface of each leg and in line on opposite edges thereof.

8. A belt fastener including a base, and a leg projecting from each end of the base, each leg being formed into defined sections having perceptible limits and including a base section that is curved to provide rigidity and the other sections having different cross sectional areas one with respect to another.

9. A belt fastener including a base and a leg projecting therefrom at each end thereof, said legs having shoulders on that side of said legs facing each other thereby forming each leg with a base section and with other sections, said shoulders insuring substantially parallel disposition of the base of the fastener and of said sections, each with another, when the fastener is bent to secure a belt.

10. A belt fastener including a base and a leg projecting from each end of the base, each leg comprising a base section formed to prevent bending, an intermediate section, means to insure bending between the base sections and the intermediate sections, a tip section, and means to insure bending of the tip section before that of the intermediate section.

CHARLES A. JOHNSON.

Copies of this patent may be obtained for five cents each, by addressing the "Commissioner of Patents, Washington, D. C."